United States Patent
Zito et al.

(10) Patent No.: US 9,169,959 B2
(45) Date of Patent: Oct. 27, 2015

(54) UNIVERSAL TABLET AND SMARTPHONE HOLDER

(71) Applicants: David Zito, Pasadena, CA (US); Grant J. Stafford, San Juan Capistrano, CA (US)

(72) Inventors: David Zito, Pasadena, CA (US); Grant J. Stafford, San Juan Capistrano, CA (US)

(73) Assignees: David Zito, Pasadena, CA (US); Orant J. Stafford, San Juan Capistrano, CA (US)

( * ) Notice: Subject to any disclaimer, the term of this patent is extended or adjusted under 35 U.S.C. 154(b) by 51 days.

(21) Appl. No.: 14/205,075

(22) Filed: Mar. 11, 2014

(65) Prior Publication Data

US 2014/0291469 A1  Oct. 2, 2014

Related U.S. Application Data

(60) Provisional application No. 61/778,574, filed on Mar. 13, 2013.

(51) Int. Cl.

| | |
|---|---|
| *F16M 11/00* | (2006.01) |
| *F16M 11/04* | (2006.01) |
| *F16M 11/18* | (2006.01) |
| *F16M 13/00* | (2006.01) |
| *G06F 3/01* | (2006.01) |
| *G06F 1/16* | (2006.01) |
| *F16M 11/12* | (2006.01) |
| *F16M 11/22* | (2006.01) |

(52) U.S. Cl.
CPC ........... *F16M 11/041* (2013.01); *F16M 11/046* (2013.01); *F16M 11/128* (2013.01); *F16M 11/18* (2013.01); *F16M 11/22* (2013.01); *F16M 13/00* (2013.01); *G06F 1/1632* (2013.01); *G06F 3/012* (2013.01); *F16M 11/00* (2013.01); *F16M 2200/04* (2013.01)

(58) Field of Classification Search
USPC ...................... 248/146, 149, 153, 346.3, 910; D13/108; D21/333; D14/447, 432, D14/434, 439, 448, 451, 452, 457, 239, 250, D14/251, 253, 238.1, 440, 205, 223, 224, D14/224.1, 229; D6/406.1, 406.2, 406.3, D6/406.4, 406.5, 406.6, 601
See application file for complete search history.

(56) References Cited

U.S. PATENT DOCUMENTS

| | | | | |
|---|---|---|---|---|
| 1,351,817 | A | * | 9/1920 | Walters ........................... 223/92 |
| 2,613,899 | A | * | 10/1952 | Wagner et al. ................. 47/40.5 |
| 2,806,131 | A | * | 9/1957 | Palmer ........................... 362/186 |
| 2,868,255 | A | * | 1/1959 | Fancher ......................... 206/423 |
| D293,186 | S | | 12/1987 | Parnham |
| 4,825,587 | A | * | 5/1989 | Stancil ........................... 47/40.5 |

(Continued)

OTHER PUBLICATIONS

Jawbone Wireless Speakers and Speakerphone pp. 1-4 from website. https://web.archive.org/web/20120302023553/http://jawbone.com/speakers.

*Primary Examiner* — Alfred J Wujciak
(74) *Attorney, Agent, or Firm* — Convergent Law Group LLP; Rick Batt

(57) ABSTRACT

A universal tablet and smart phone holder includes an enlarged soft core, an upper tip section; an elongate spine element extending at least partially through the soft core and to the tip section. A flexible cover is disposed about the soft core, spine element and tip section. The spine element and tip section are operable to bend and rotate such that when a tablet or smartphone is placed into the novel holder, a bottom edge of the tablet is supported by the soft core, and an upper edge of the media device held by the tip section such that the media device is firmly secured thereto.

12 Claims, 14 Drawing Sheets

(56) References Cited

U.S. PATENT DOCUMENTS

| | | |
|---|---|---|
| D358,270 S | 5/1995 | Diamond |
| 5,452,877 A * | 9/1995 | Riffle et al. ............ 248/511 |
| D389,360 S | 1/1998 | York et al. |
| D453,155 S | 1/2002 | Michel |
| D637,031 S | 5/2011 | Anderson |
| D643,845 S | 8/2011 | Hong |
| 8,047,217 B1 * | 11/2011 | Schermerhorn, Jr. ......... 135/118 |
| D652,045 S | 1/2012 | Hong |
| D654,751 S | 2/2012 | Newnam |
| D655,285 S | 3/2012 | Piccolo |
| D670,523 S | 11/2012 | Fernandez |
| D687,833 S | 8/2013 | Gittins |
| D687,834 S | 8/2013 | Gittins |
| D687,835 S | 8/2013 | Gittins |
| D703,674 S | 4/2014 | Zito et al. |
| 2010/0213343 A1 | 8/2010 | Opresnik |
| 2010/0320341 A1 | 12/2010 | Baumann et al. |

\* cited by examiner

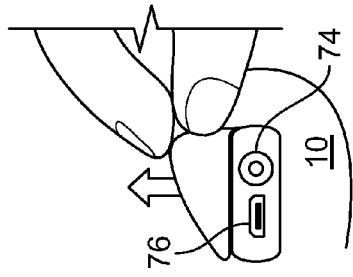
FIG. 11B
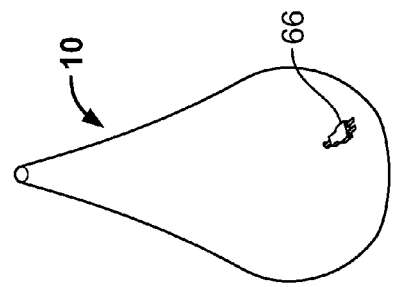
FIG. 11A
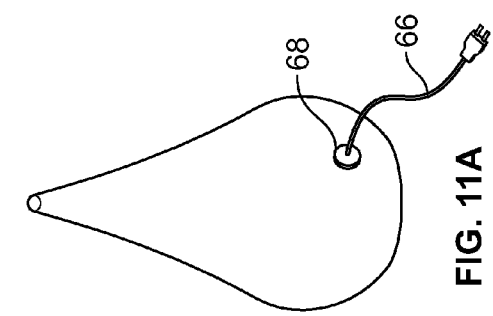
FIG. 10
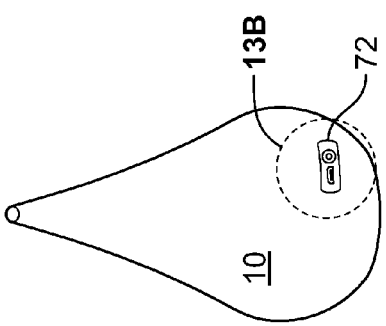
FIG. 13B
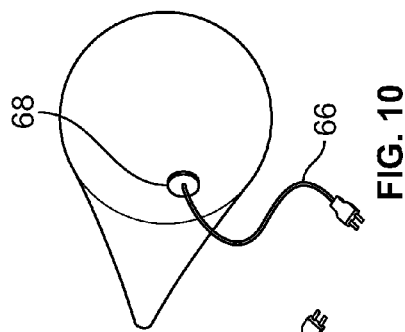
FIG. 13A
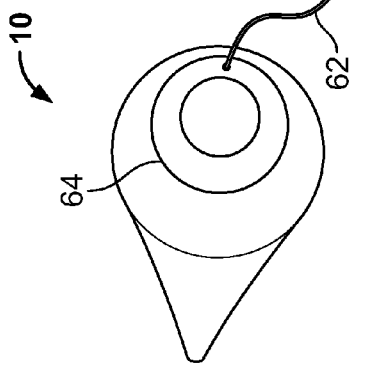
FIG. 9
FIG. 12

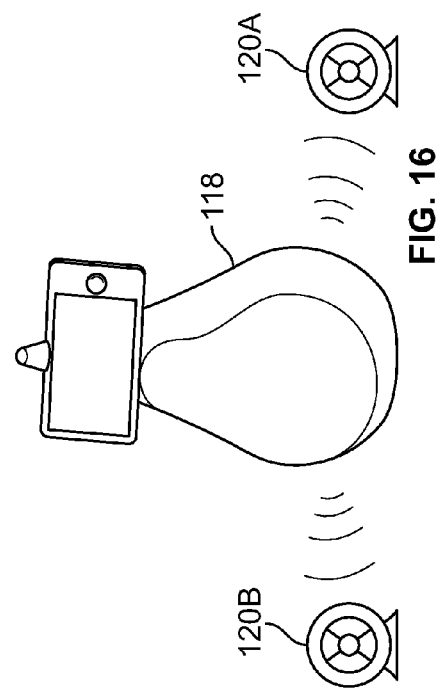
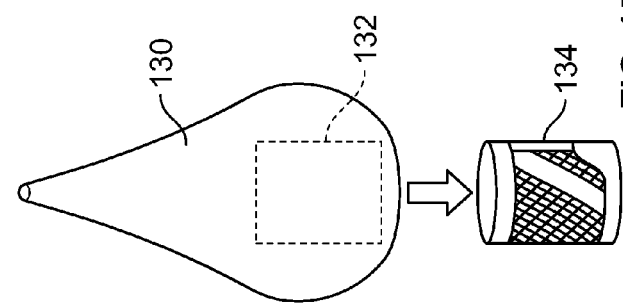
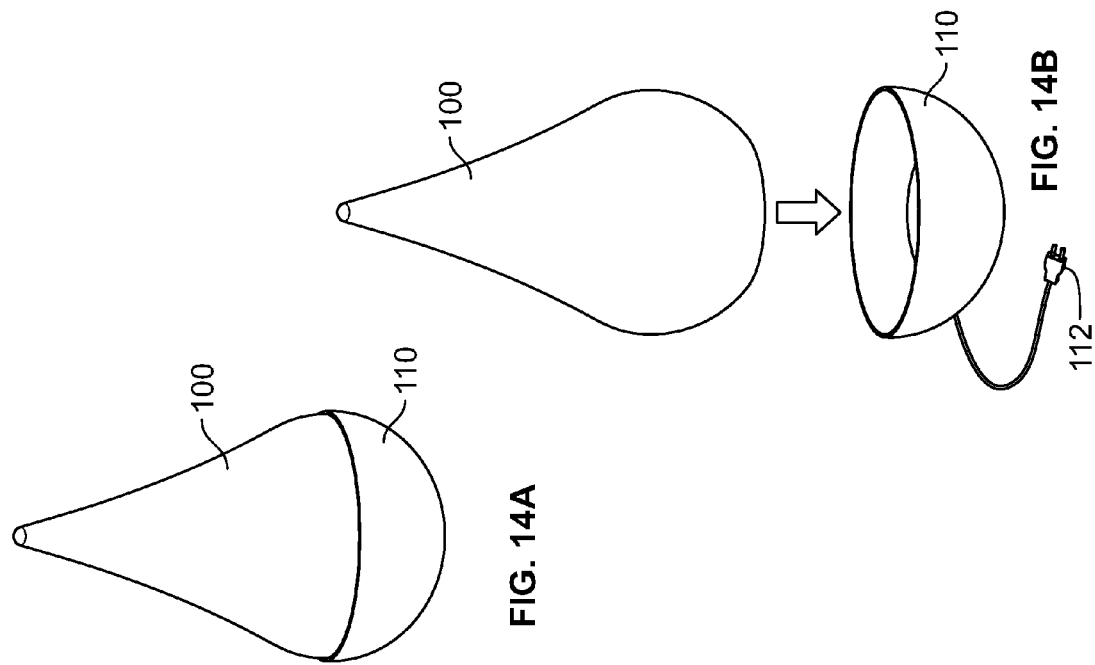

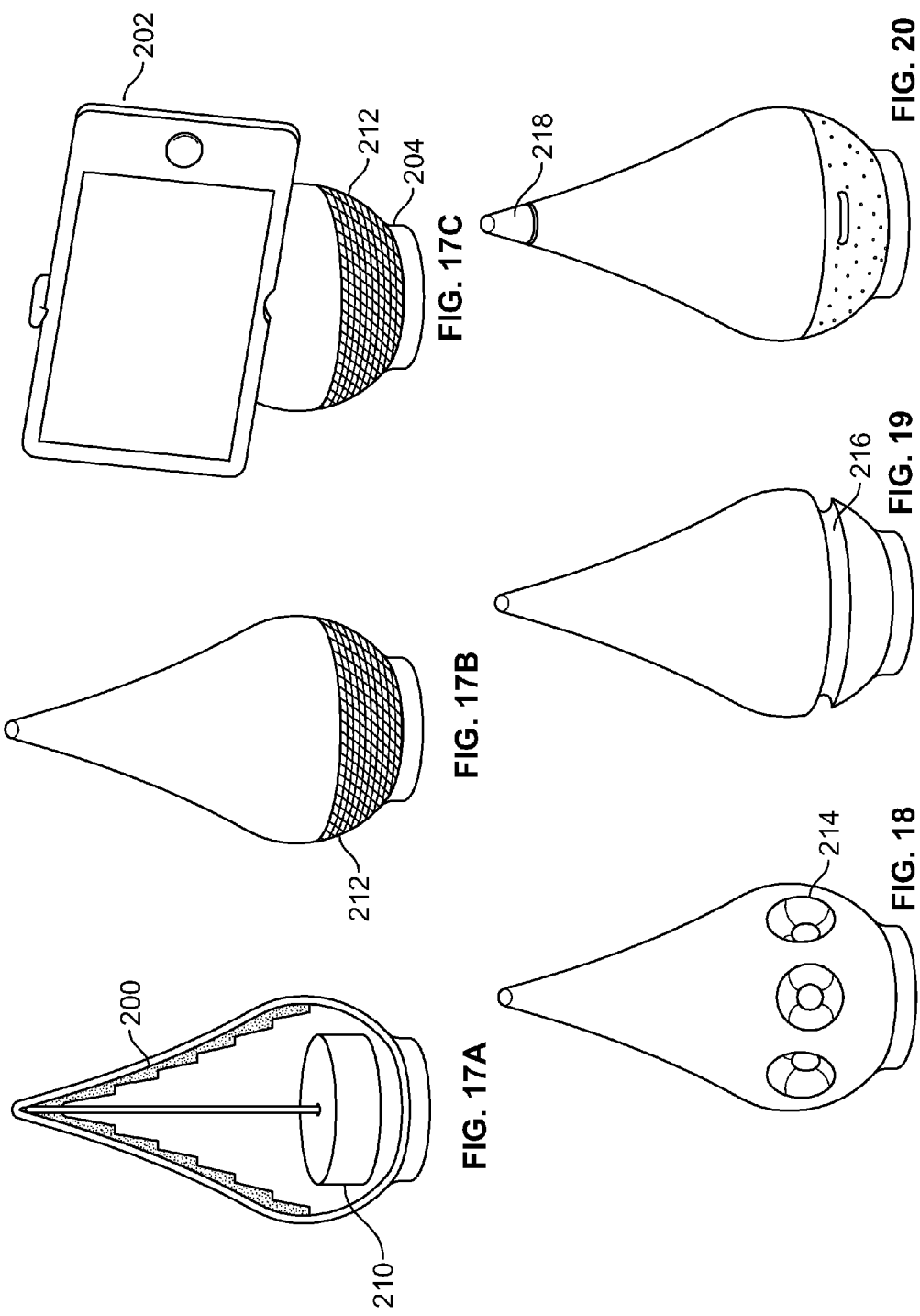

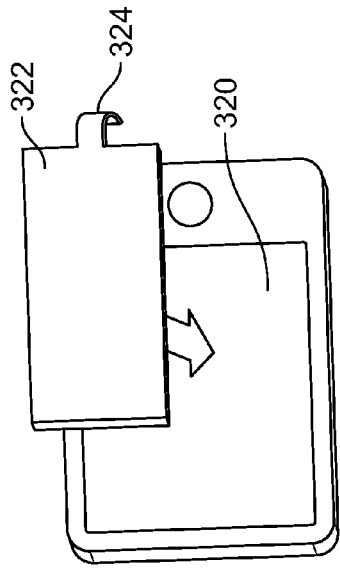
FIG. 23
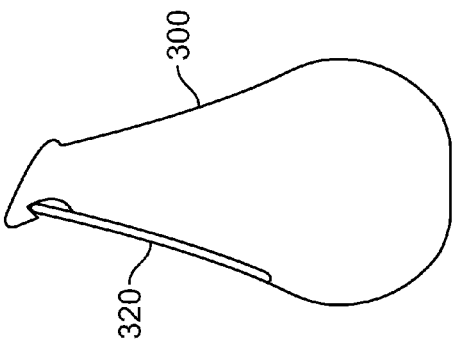
FIG. 25
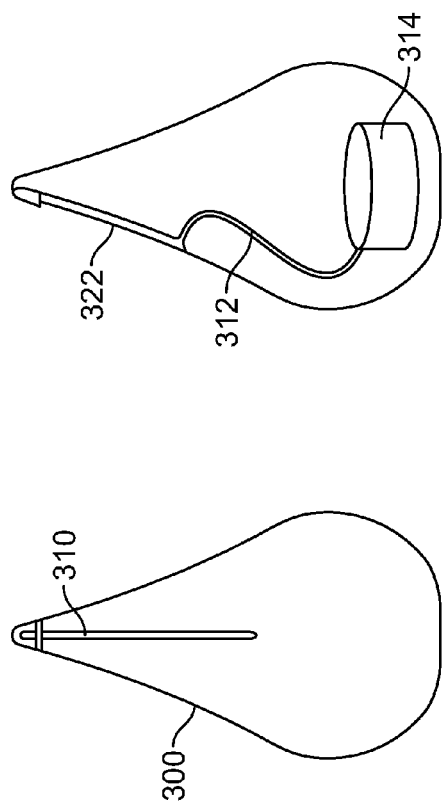
FIG. 22
FIG. 21
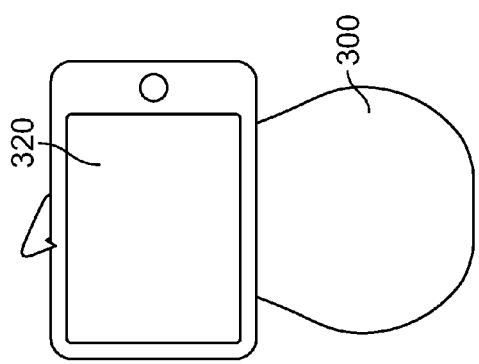
FIG. 24

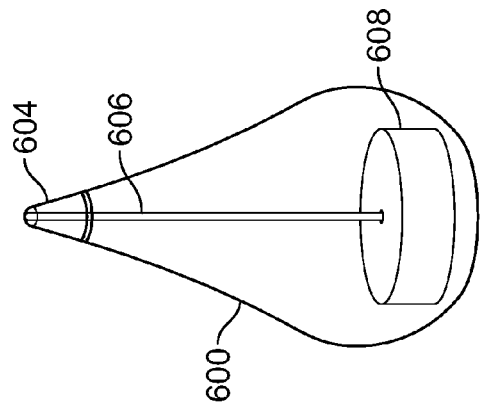
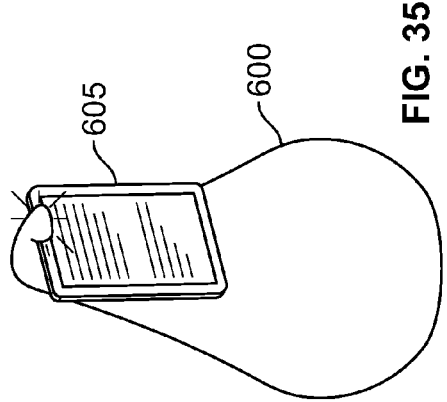
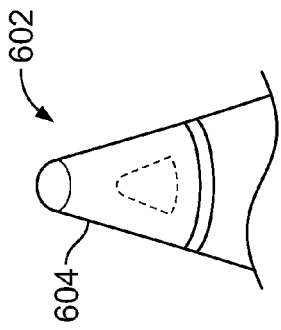
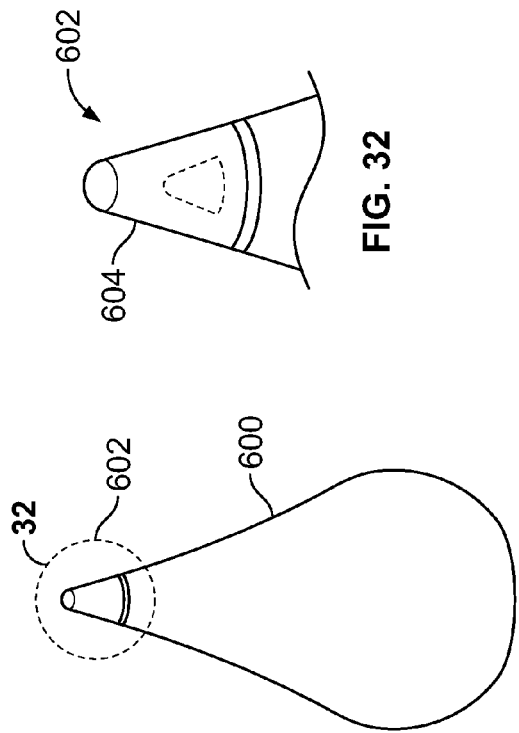
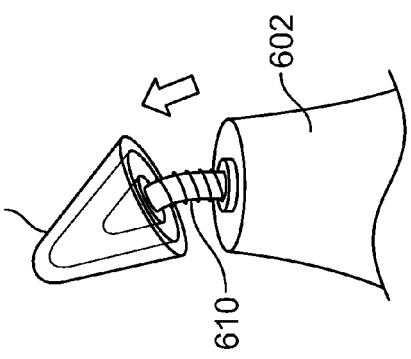

UNIVERSAL TABLET AND SMARTPHONE HOLDER

CROSS-REFERENCE TO RELATED APPLICATIONS

This application claims the benefit of provisional patent application No. 61/778,574, filed Mar. 13, 2013, and entitled "universal tablet and smartphone holder."

BACKGROUND OF THE INVENTION

The present invention is directed to holders for portable electronic media devices, and in particular, to holders or stands for tablets and smartphones.

There are a variety of portable electronic media devices including, for example, smartphones, handheld gaming devices, tablet computers or tablets, computer monitors, wireless reading devices, personal digital assistants, audio recorders and music players.

The media devices, however, do not have a standard size. For example, the smartphone is much smaller than the tablet. Even portable electronic devices of a particular category (e.g., smartphone only) do not have a standard size. This is true, not only for portable electronic devices that are made by different manufacturers, but also to different models made by the same manufacturer. For example, Apple's iPhone® 2G Smartphone has a different shape than Apple's iPhone® 3G smartphone.

Due to the different shapes and sizes of portable electronic devices, stands for such devices have generally had to be designed for each category of device, or worse, for each individual device. When a consumer purchases a tablet in addition to her smartphone, the consumer has generally been required to purchase a new stand or adaptor (if available) for the larger tablet. Additionally, when a consumer upgrades from one portable electronic device (Apple's iPhone® 2G smartphone) to another portable electronic device (Apple's iPhone® 3G smartphone), the consumer has generally been required to purchase a new stand (if available) for the upgraded device.

Various known stands have been developed to address some of the shortcomings identified above. US Patent Publication No. 2010/0320341 to Baumann et al. and U.S. design application No. D652,045 to Hong, for example, describe various stands that can hold media devices. The described designs, however, tend to be applicable for slight variations within a category of media devices and or require adaptors.

There is still a need to develop a universal holder for portable electronic media devices that accommodates devices of different categories as well as devices within the same category but having different shapes and/or sizes. Additionally, it is desirable for a universal tablet and smartphone holder that does not require device-specific adaptors to hold and secure the media device.

SUMMARY OF THE INVENTION

The description, objects and advantages of the present invention will become apparent from the detailed description to follow, together with the accompanying drawings.

A universal media device holder includes a tip section; an enlarged soft core; an elongate spine element extending at least partially through the soft core and to the tip section; and a flexible cover disposed about the soft core, spine element and tip section. The spine element and tip section are operable to bend the tip section from an open position to a grabbing position in which the tip section bends over an upper edge of the media device when the media device is placed against the holder. Additionally, a lower edge of the media device is supported by the soft core. Together, the tip section and the soft core body serve to clamp and secure the media device in place.

In embodiments a universal media device holder for releasably holding a media device comprises a weighted base; an enlarged soft core; an upper tip section; and an elongate moldable spine element extending from the base, through the soft core, and to the tip section. The holder includes a flexible outer skin.

In embodiments the soft core may be comprise foam. The soft core may comprise at least one ridge for supporting the first edge of the media device.

In embodiments the tip preferably has a taper shape.

In embodiments the tip section comprises a slot to receive the upper edge of the media device.

In embodiments the holder has the shape of a droplet. In embodiments the media device is clip-less and firmly held without of a clip or snap adaptor.

In embodiments a filler is disposed under the cover. In embodiments the filler comprises a plurality of beads.

In embodiments the holder includes a weighted base and an end portion of the spine element extends from the base. In embodiments the base comprises a battery.

In embodiments the cover has a frictional outer surface. In embodiments the cover comprises latex.

In embodiments the spine element comprises a manually moldable wire or wire bundle.

In embodiments the holder includes a charger in electrical communication with an internal electrical supply (e.g., battery pack) for charging the media device.

In embodiments the holder further comprises at least one electro-mechanical element for articulating the tip section.

In embodiments the holder further comprises a light.

In embodiments the holder comprises an electrical cord extendable from the holder to connect with an external electrical source.

In embodiments the holder comprises sensor.

In embodiments the holder comprises camera.

In embodiments the holder further comprises a detachable sock at least partially surrounding the cover.

In embodiments the holder further comprises a cavity, and the cavity is sized to hold at least one ancillary device. In embodiments the holder includes the ancillary device. The ancillary device may vary. In embodiments the ancillary device is a speaker chargeable when held in the cavity. In embodiments the speaker is operable to play audio based on a wireless technology.

In embodiments, a method for holding a media device includes any of the steps described herein where logically not exclusive to one another to secure the media device to the holder.

BRIEF DESCRIPTION OF THE DRAWINGS

FIGS. 9-12 are illustrations of a tablet holder comprising various cord configurations;

FIG. 13A is a rear view of another tablet holder including a port connector;

FIG. 13B is an enlarged view of the port connector shown in FIG. 13A;

FIGS. 14A-14B are illustrations of another tablet holder comprising a detachable base portion;

FIG. 15 is an illustration of another tablet holder comprising an internal cavity and a portable speaker insertable therein;

FIG. 16 is an illustration of another tablet holder comprising speakers;

FIGS. 17a-17c illustrate another tablet holder including an internal battery and a speaker.

FIGS. 18-20 illustrate another tablet holder comprising various internal speaker configurations;

FIGS. 21-25 illustrate another tablet holder comprising charger for delivering power and charging the media device;

FIGS. 31-35 illustrate another tablet holder comprising various light configurations for illuminating a target surface.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Figure 1A:
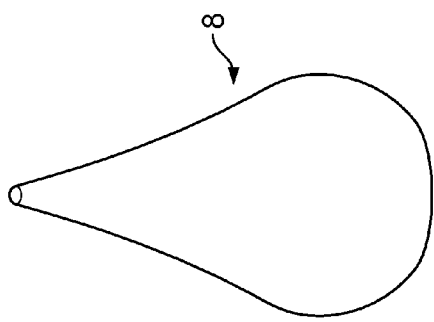
FIG. 1A is a perspective view of a tablet holder.

FIG. 1 shows a universal tablet and smart phone holder 8. The holder is designed to hold a wide variety of media devices regardless of size, shape, generation, model, and manufacturer. Examples of media devices without limitation include tablets, tablet computers, electronic readers, PDAs, and Smartphone.

Figure 1B:
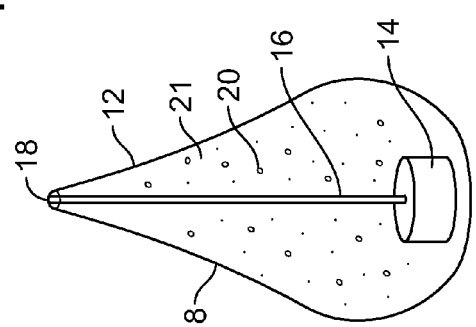
FIG. 1B is a semitransparent perspective view a tablet holder.

With reference to FIG. 1B, holder 8 is shown comprising weighted base or support 14, a soft core 20, a tapering upper section terminating in a tip 18, and a spine element 18 extending through the soft core 20 to the tip. Additionally the holder is shown having a flexible outer skin 12.

Figure 2A:
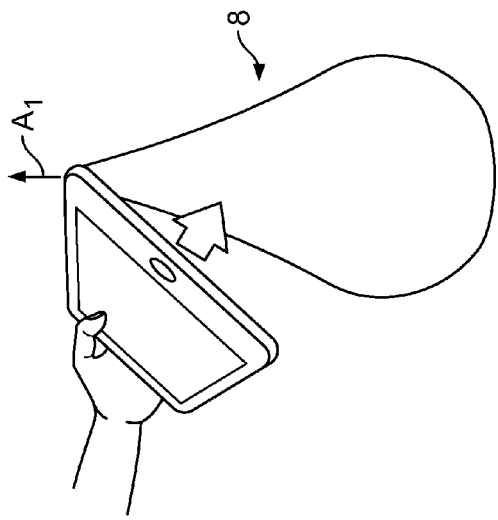
FIGS. 2A-2B are illustrations of placing and securing a tablet in the tablet holder, respectively.
Figure 2C:
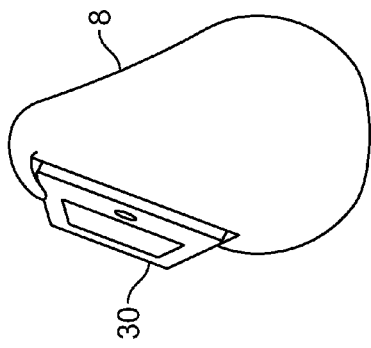
FIG. 2C is a side view of the tablet holder and tablet shown in FIG. 2B.
Figure 2B:
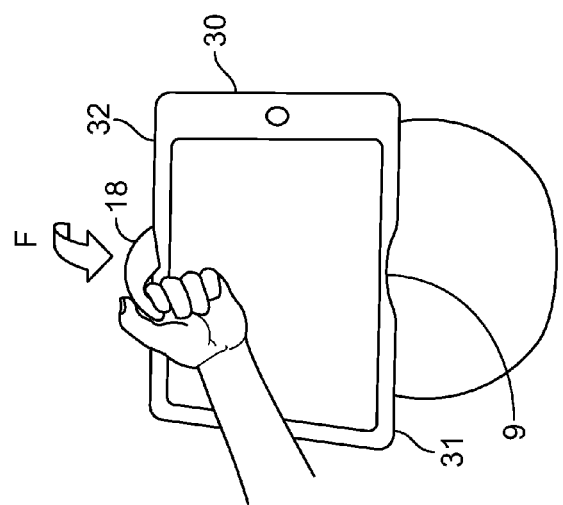

FIGS. 2A-2C illustrate a tablet placed and held in the holder 8. First, and with reference to FIG. 2A, the user places the tablet 30 into the holder. In particular the user places the tablet 30 against outer surface of holder 8.

As shown in FIG. 2B, a lower edge 31 of the tablet is supported by a portion 9 of the lower body of the holder 8. Lower edge 31 of the tablet is shown supported by the soft core 20 as will be described in more detail herein.

FIG. 2B also illustrates bending the upper tip section over the tablet 30. In particular, user applies a force F to the tip section 18 to bend the tip or finger over the upper edge 32 of the tablet. Consequently, the tablet is firmly secured to the holder with its screen being visible to the user.

FIG. 2C shows a side view of the universal holder 8 having secured thereto a tablet.

The components and materials of the holder 8 may vary. In an exemplary embodiment, a spine element 16 comprises a metal wire such as a steel wire. The wire is bendable and can hold its shape. The wire is preferably moldable and flexible. Once the wire is positioned in a configuration (e.g., curved), the wire retains its shape. If desired, the wire may be reconfigured to another position (or shape) and the wire does not lose its strength.

The base or support 14 can serve to balance the holder. Preferably the base comprises a material that weighs a sufficient amount to counter balance a tablet or phone placed in the holder 10 so that the structure does not tip over. The base 14 may comprise sand, or water, or hold batteries to give it increased weight. The base also is preferably rigid to provide a structure from which the spine element extends. In another example, the base or support is a metal plate.

Examples of the soft core include foam and memory foams.

Examples of the cover 12 or outer skin include latex. The cover is preferably flexible, stretchable, soft, and comprises a frictional exterior so as to assist in gripping a media device. Examples of the skin material include without limitation latex, knit cotton, spandex, etc.

The holder 8 may additional contain a filler material 21 such as beads or plastic pellets, foam pellets and the like. The filler 21 preferably is disposed in space between the soft core and the skin. Examples of the filler material or substrate include without limitation Styrofoam, cotton stuffing, etc. In embodiments, the holder does not comprise a filler.

Figure 3A:
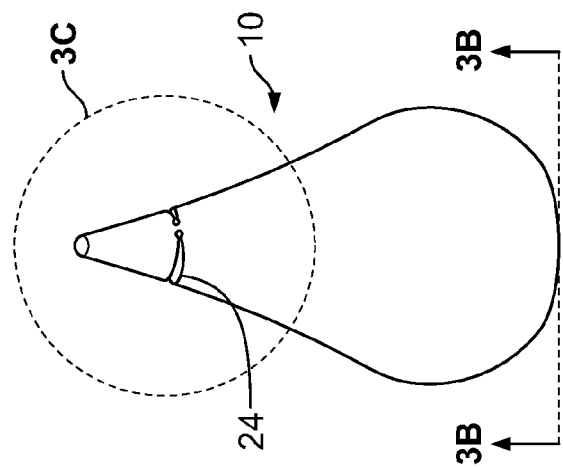
FIG. 3A is a perspective view of another tablet holder.
Figure 3B:
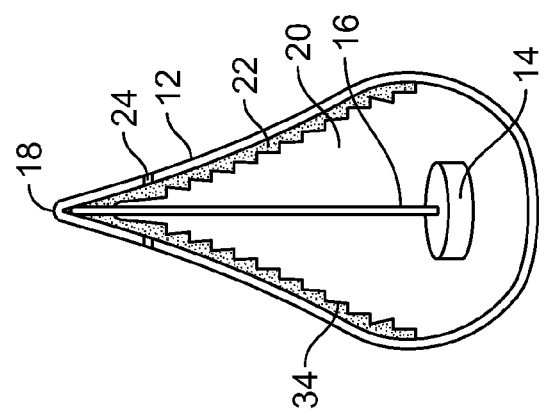
FIG. 3B is a cross sectional view taken along line 3B-3B of the tablet holder shown in FIG. 3A.
Figure 3C:
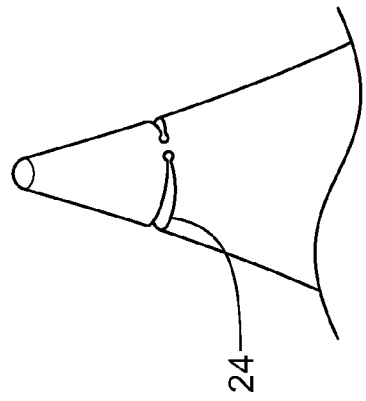
FIG. 3C is an enlarged view of the top portion of the tablet holder shown in FIG. 3A.

FIGS. 3A-3C show another embodiment of a universal tablet holder 10. The holder shown in FIGS. 3A-3C is similar to that shown in FIGS. 1-2 except the soft core 20 contains a plurality of ridges or ledges 22. Additionally the upper section 12 is shown comprising a slit or slot 24.

Figure 5:
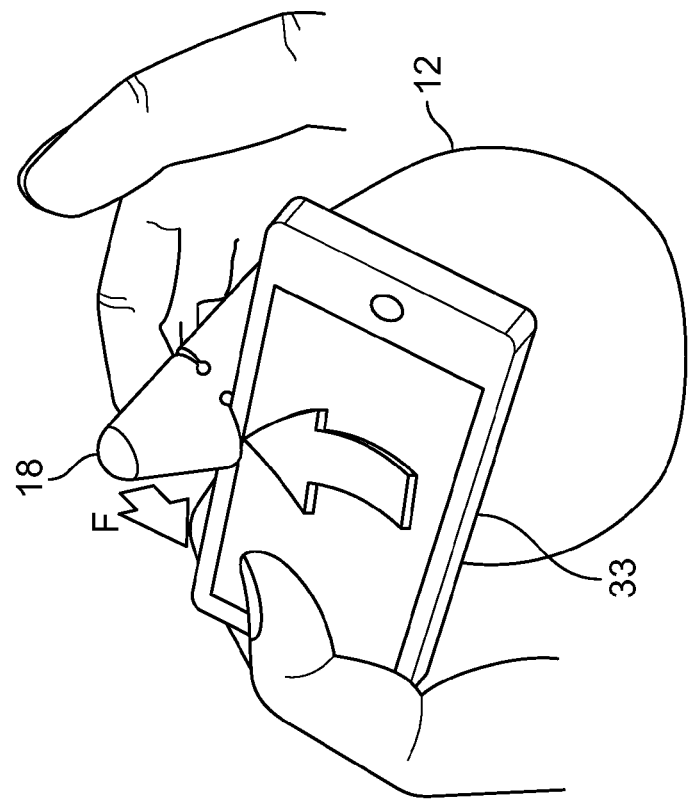
FIGS. 4-5 are illustrations of placing and securing a Smartphone in the tablet holder, respectively.
Figure 4:
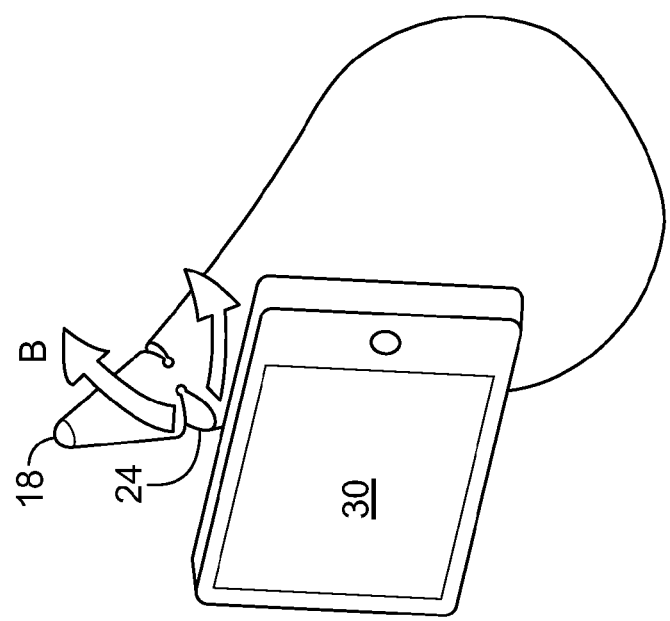
Figure 7:
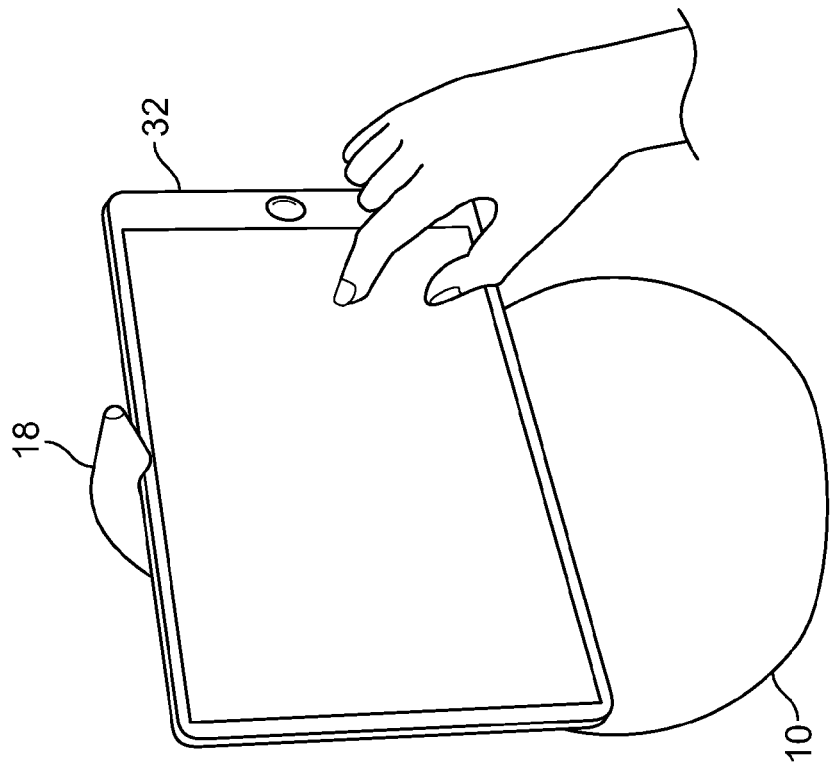
FIGS. 6-7 are illustrations of a semitransparent side view and a perspective view, respectively of a tablet holder and tablet secured thereon.

In use, and with reference to FIGS. 4-5, a force B is applied to the tip to create a gap in the slot 24 for receiving a device 33 such as a smartphone. After the upper edge of the device 33 is placed in the slit, a force F is applied to tip 18 to clamp or grip the upper edge of the device 33 as shown in FIG. 5.

Figure 6:
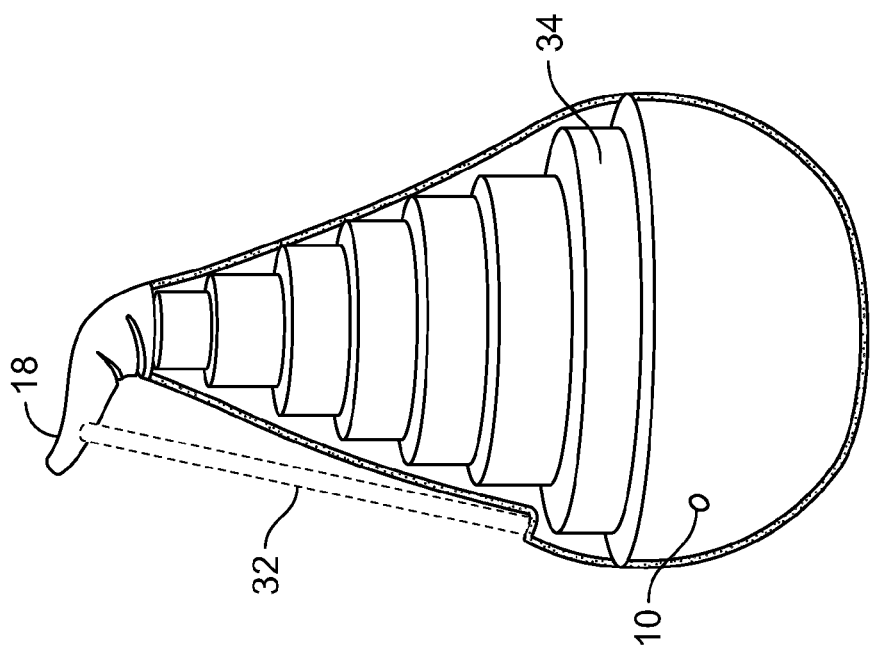

FIG. 6 shows a semitransparent side view of the universal holder 10 having a tablet 32 secured thereto. In addition to the tip section of the holder bending over and clamping the upper edge of the tablet, the holder provides a ledge 34 to support the lower edge of the tablet. Ledge 34 is shown extending circumferentially about the core. Ledges are preferably located at different vertical positions along the body to accommodate different types and categories of electronic media devices.

The ledge may be part or integral with the soft foam core. As described above, a soft memory foam is an example of a core. The core (including one or more ridges 34) and the articulating tip 18 operate together to firmly hold the tablet 30 in place.

In embodiments, the universal holder described herein holds a wide variety of types (and entire categories) of devices without a clip or device-specific adaptor.

The shape of the universal holder described herein may vary. Although a smooth gently curved shape (e.g., droplet shape) is preferred, the shape may be different and the invention is only intended to limited as recited in the appended claims. An exemplary shape is shown in co-owned application Ser. No. 29/447,752, filed Mar. 6, 2013, incorporated by reference herein in its entirety.

In embodiments, the holder has an animal or dinosaur (e.g., brontosaurus) shape.

The head or neck of the animal could be used to manipulate the holder or control functionalities as described herein.

Figure 8C:
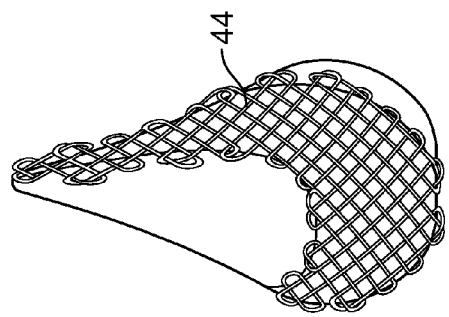
FIGS. 8A-8F are perspective views of various tablet holder and sock configurations.
Figure 8F:
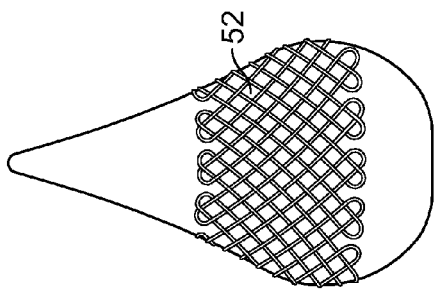
Figure 8B:
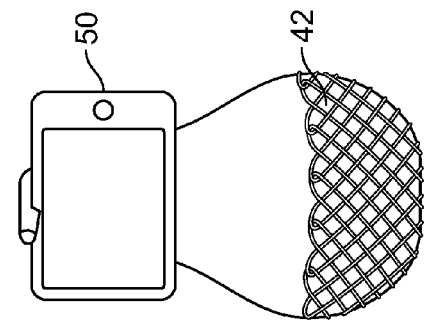
Figure 8E:
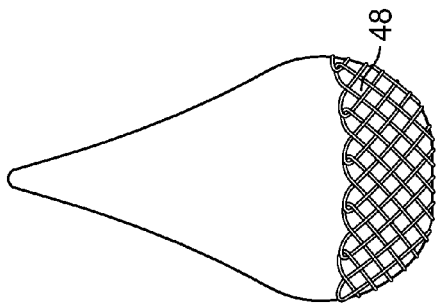
Figure 8A:
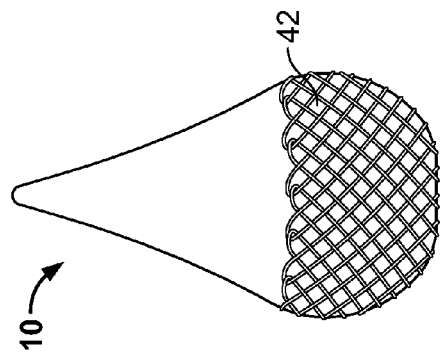

FIGS. 8A-8F are perspective views of various tablet holder and sock configurations. FIG. 8A shows holder 10 comprising a knitted sock 42. The sock or sleeve member 42 covers a bottom portion of holder 10. The sock may be fabricated from a wide variety of materials such as a soft fabric. Examples of sock materials include yarn, polyester fiber and cotton. Sock may be woven, braided, sewn, or otherwise formed.

FIG. 8B shows holder including sock 42, and a smartphone 50 secured in the holder. Tip is shown grabbing an upper edge of device 50. A lower edge of the device 50 rests in the body or core of the holder. Preferably, although not shown, a ledge or ridge supports the lower edge of the device 50.

Figure 8D:
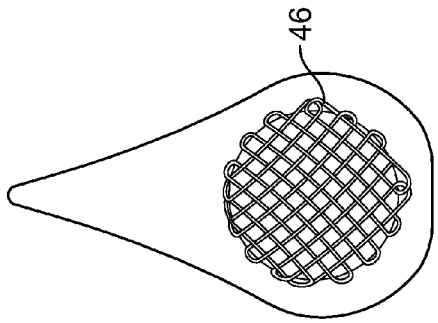

The shape of the sock may vary. FIG. 8C, for example, shows a sock 44 covering a first side of the holder. The sock may be configured to cover a left, or right side, front or back. FIG. 8D shows another sock 46 having a size and shape to fit on the center of the holder. FIG. 8F shows a band shaped sock 52. The sock may be removable or permanent, or otherwise fitted to the holder body.

FIGS. 9-12 illustrate a holder 10 comprising various cable extensions. Cable can be an electrical cable for connecting with an electrical source such as standard AC outlet.

FIG. 9 shows a holder 10 including a cable 62 extending from the bottom of the holder. A storage 64 is present in the bottom of the holder for accepting the cable. The storage 64 is shown as a circular cavity. The cable may be wound or wrapped into the cavity 64.

FIGS. 10-11A show a holder and a retractable cable 66 extending from an opening 68. The opening 68 is circular shaped and located towards the bottom of the holder. FIG. 11B shows the cable retracted into opening 66. Retracting structures may vary and an example retractor is a spring loaded spool which is biased to draw the cable into the opening.

FIG. 12 shows another holder 10 comprising a cable opening 70 having a slot shape. Cable may be retracted (R) and extended (E) from the slot.

FIGS. 13A-13B show a holder comprising port connections 72 such as DC port, and or USB type or other type of port connection for AC or DC charging. FIG. 13B is an enlarged view of the port connection. In embodiments the port connections may be covered with the skin.

The cable and ports are electrically linked to an electrical unit such as rechargeable batteries (e.g., lithium ion battery pack) contained within the holder and to provide power or various functionalities as described herein.

FIG. 14A shows a universal tablet holder 100 and charging unit 110 engaged with the tablet holder. Both of the components holder 100, and unit 110 may include conducting portions or connectors that allow the universal holder to be charged when the holder is received by the base unit 110.

FIG. 14B shows the universal holder removed from the base unit 11. Base unit 110 is shown having a pocket 112 for receiving a cable, lights, storage wires, plugs, etc.

FIG. 15 shows a universal holder 130 having a cavity 132 for receiving a speaker 134. Speaker may be wireless speaker chargeable within the universal holder via connectors. A battery pack as described herein can charge the speaker when the speaker is stored in the cavity of the universal holder.

FIG. 16 shows universal holder 118 having a smartphone secured thereto, and a pair of speakers 120A,120B adapted to wirelessly communicate with the smart phone to play music or audio. Examples of wireless technology include without limitation Bluetooth technology. Bluetooth, standardized as IEEE 802.15.1, is a wireless technology standard for exchanging data over short distances (using short-wavelength radio transmissions in the ISM band from 2400-2480 MHz) from fixed and mobile devices, creating personal area networks (PANs) with high levels of security. However, the invention is not limited to Bluetooth, and other wireless technologies can be incorporated as desired into the holder and a paired device.

The speakers 120A, 120B may be stored when not in use in a cavity within the holder 118. The holder may be operable to selectively charge the speakers when the speakers are stored in the cavity by actuating a switch or other means to connect a battery pack with the speakers.

FIGS. 17-20 show a holder 200 including an internal battery 210 and speaker 212. Speakers may be powered via the battery pack and wirelessly enabled by, for example, Bluetooth® technology.

The speaker configuration may vary widely. FIG. 18 shows lower portion having a plurality of speakers disposed about a lower circumference of the holder's body. FIG. 19 shows a relief in the surface of the holder. A relief or other geometric means may be provided to adjust or enhance sound quality.

Universal holder may have a switch or knob operable in to the body for turning ON/OFF the speaker(s) and controlling the volume. For example, as shown in FIG. 20, a knob may be formed in the upper tip section 218 to control volume.

Additional adjustment may be made to the position of the unit by manipulating the direction of the speakers. The holder may be provided with a pliable base 204 in order to make adjustments to the direction of the speakers. The pliable base may comprise a moldable structure or elements that retain their shape when moved such as a memory foam, or wire skeleton.

FIGS. 21-25 show a universal tablet holder 300 comprising a charger 322 to connect to (and charge) a tablet 320 or other portable electronic device. Access to the charger 322 is provided through a charging opening 310 in outer skin.

The charger (e.g., a charging pad 322 comprising an adapter 324 to mate with the media device 320) is connected internally to the battery 314 via a connector 312. With reference to FIG. 23, charger may be shaped in the form of thin planar pad which can be matched with the backside of the device 32320. As an assembly, the charging pad and tablet are secured to the universal holder as described herein.

FIG. 25 illustrates a side view of the universal holder and a tablet being charged as described herein.

Figure 28:
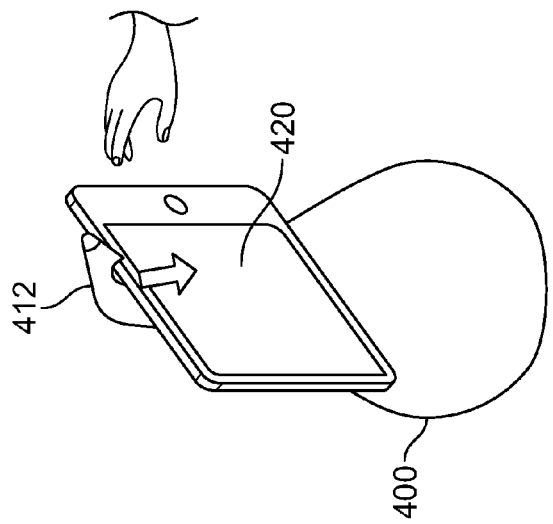
FIGS. 26-28 illustrate another tablet holder comprising a dynamic spine element.
Figure 27:
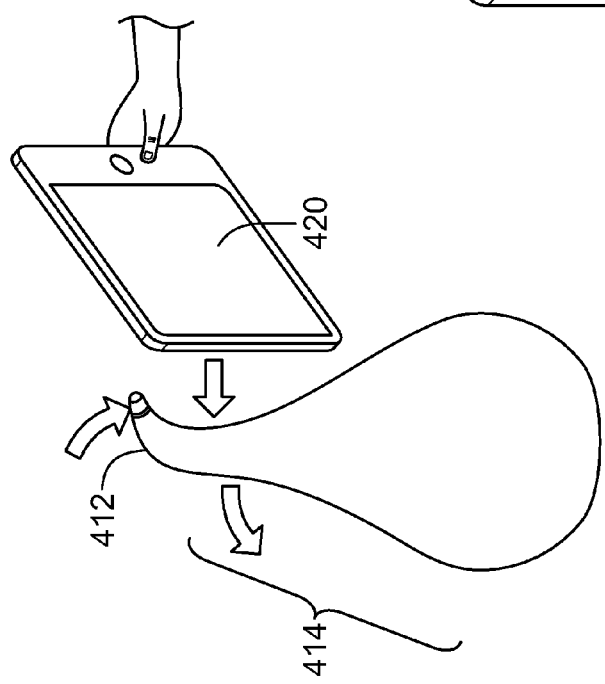
Figure 26:
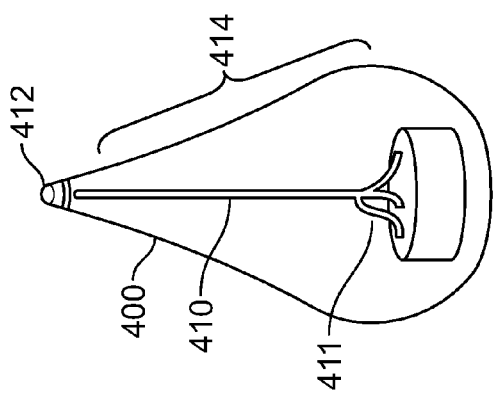

The universal tablet holder may comprise hardware and software to provide for additional functionality. FIGS. 26-28 show a universal tablet holder 400 comprising a dynamic spine element 410 which is configured to alter shape when the media device is detected.

A sensor 412 is shown at the tip of the holder 400. The sensor may be optically or electronic based (e.g., Bluetooth, wireless, etc.) to detect the presence of a live media device in its proximity as shown in FIG. 27.

Once the media device is detected, one or more actuating or mechanical elements 411 are activated. As shown in FIG. 27, the mechanical elements bend the spine element 410 such that a mid-portion 414 is rotated backwards while the tip portion is rotated 412 forwards. Consequently, the media device 420 may be securely held as shown in FIG. 28.

The motor or mechanical elements are preferably connected to the energy supply, e.g., a battery pack. Power is supplied to the mechanical elements to activate the mechanical elements when the sensor detects the presence of the media device. A micro processor is preferably included to receive input from the sensor and adapted to provide output to a relay or controller to activate the mechanical elements.

In one embodiment a memory unit contains a library of media device information (e.g., model number, and corresponding size, for various electronic media devices). The microprocessor operates to compare the sensed data with the information in the library, and to direct the spine motors to a proper orientation to accommodate the particular media device being sensed. The functionality provides for automatic sensing and grabbing of the media devices.

FIGS. 29A-29D illustrate a universal tablet holder 460 having a dynamic spine and configured to automatically transition from a resting configuration 462 to a final grab configuration 462' in which the holder is shown having a tablet firmly secured thereto.

Figure 29A:
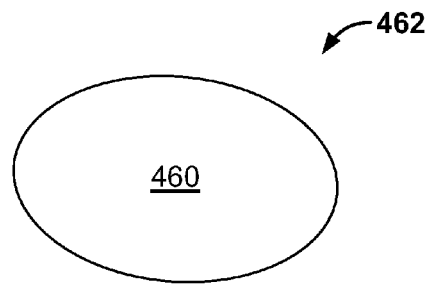
FIGS. 29A-29D illustrate another tablet holder changing shape from a resting configuration to a tablet-gripping configuration.

FIG. 29A shows the holder in a rested state, having a ball or somewhat flattened or pancake like shape.

Figure 29B:
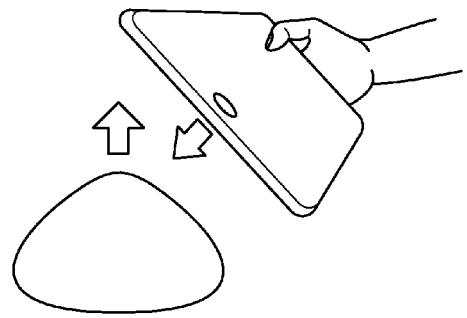

FIG. 29B shows the holder changing shape upon sensing the tablet. The sensor and articulation may be configured as described herein.

Figure 29C:
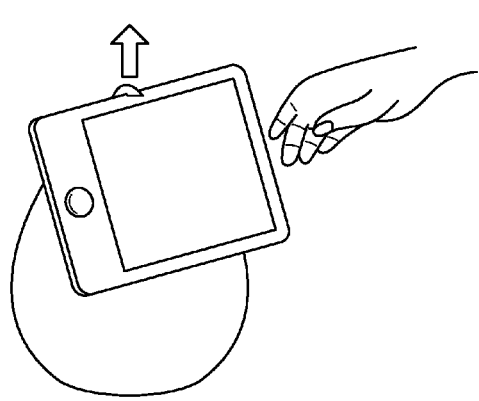

FIG. 29C shows the holder continuing to change its shape. In the view shown in FIG. 29C, the holder has a drop like shape.

Figure 29D:
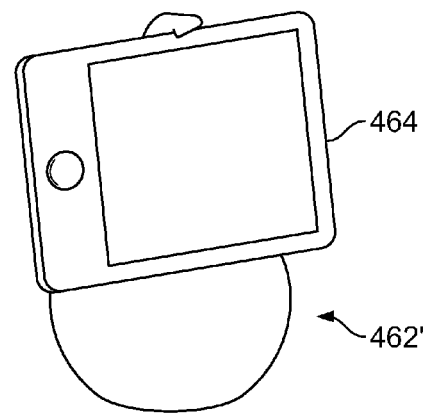

FIG. 29D shows the holder extended, and its tip deflected to grip upper edge of the tablet.

In embodiments, a dynamic or robotic spine element or body members may be controlled with various levers, and buttons such as a joystick. For example, the tip may be operable as a joystick to effortlessly shape the spine element, reducing the effort on the user to manually manipulate the holder into shape.

Figure 30A:
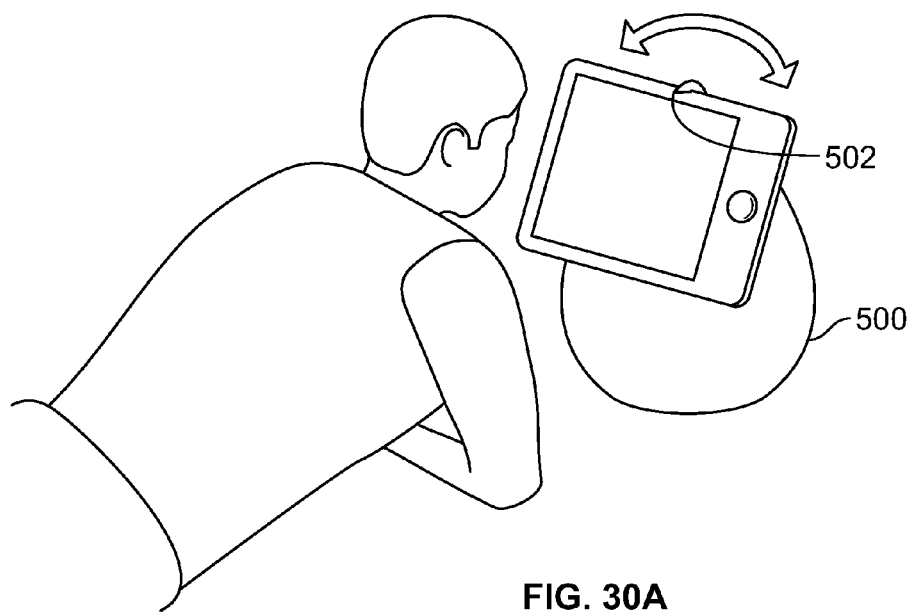
FIGS. 30A-30B illustrate another tablet holder comprising a dynamic shape automatically responsive to the user viewing direction.
Figure 30B:
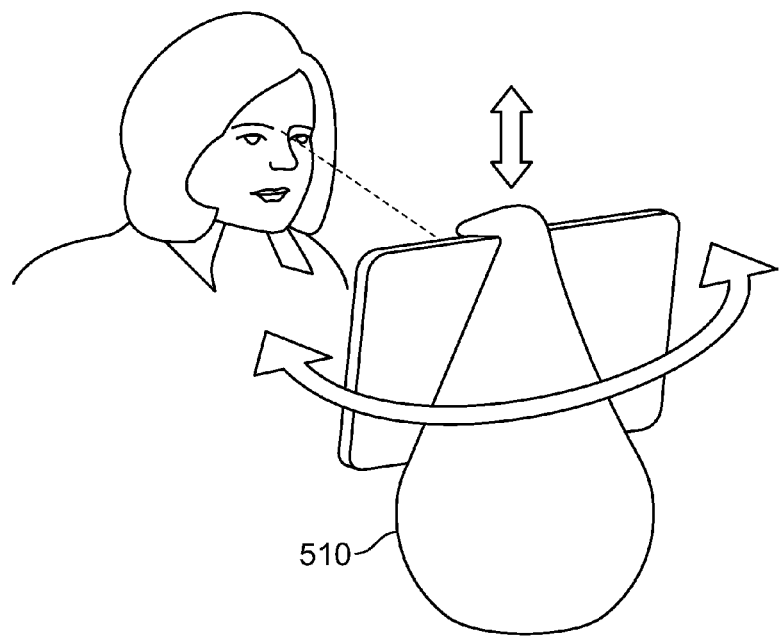

FIGS. 30A-30B illustrate a universal tablet holder 500, 510 adapted to track or rotate to optimize viewing of the screen.

FIG. 30A illustrates an internal camera 502 in the tip section of the holder. It is programmed to watch the user. A processor in the universal holder receives input from the camera and adjusts the dynamic spine for optimum viewing position. In embodiments, hidden wheels in the base are driven by motors to follow the user based on inputs from the camera. The universal holder preferably is adapted to adjust angle, rotation, and or height based on facial or body recognition of the user.

FIG. 30B illustrates another variation of a universal tablet holder configured to optimize viewability. Unlike the holder shown in FIG. 30A in which the holder itself contains the camera, in FIG. 30B, the camera function is provided by the media device. And, the universal tablet holder 510 communicates with the media device to receive its directions. Communication between the media device and the holder can be performed with a wireless technology such as, for example, Bluetooth® technology. A dynamic spine element and or wheels or other mean are provided to manipulate the holder to optimize viewability of the tablet.

FIGS. 31-34 illustrate various lighting components in a universal tablet holder 600. With reference to FIG. 31, holder 600 includes a tip 602 having lights 604 such as LED lighting. Bright light in the tip can aid in illuminating various media devices such as E-Reader 605, for example, as shown in FIG. 35.

The lights may be connected with a power source such as the battery base 608. A connecting wire 606 is shown extending from the base 608 to the light 604.

In embodiments, the light 604 is extendable and deflectable from the tip to increase illumination (e.g., and adjust direction). For example, a pull out tip 604 may be extendable and deflectable from the tip 602. A deflecting arm 610 is shown in FIG. 34 joining the tip 602 to the light array 604.

FIGS. 36-39 illustrate a universal tablet holder 630 including lighting elements in the skin for changing color, visibility, second screen notifications from device, and or extended viewing screen size from the device.

Figure 36:
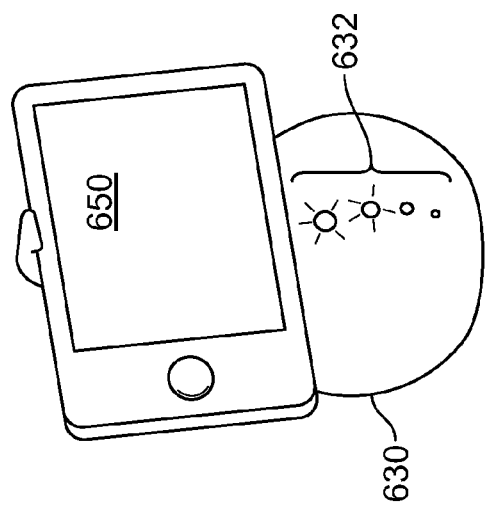

For example, FIG. 36 illustrates light in the front of the holder. The plurality of lights may pulse or remain constant. Lights may indicate power, status, volume, time, etc.

Figure 37:
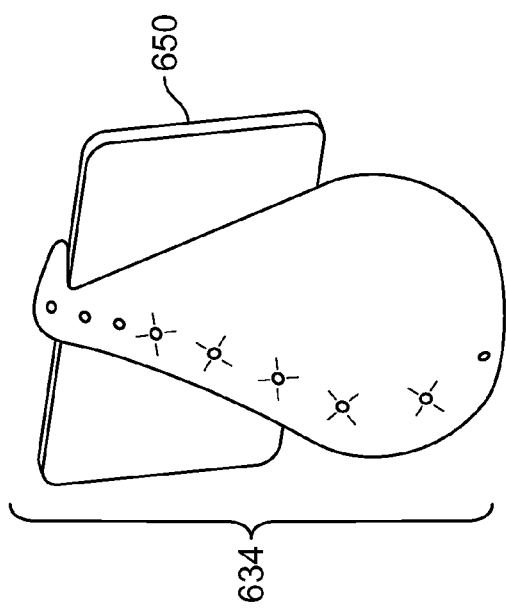

FIG. 37 illustrates another array of lights 634 on a backside of the holder. The lights 632 may be programmed or otherwise move in a sequence or pattern.

Figure 38:
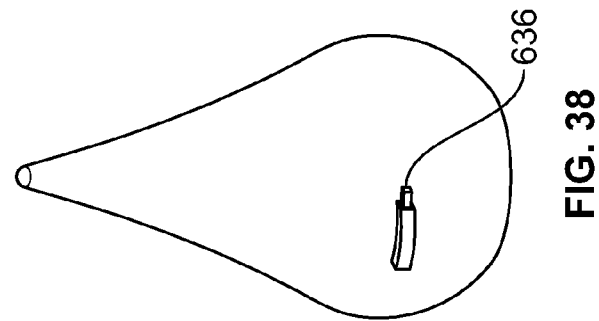
FIGS. 36-39 illustrate another tablet holder comprising various light configurations for a status or visual effect.

FIG. 38 illustrates a holder comprising a display screen 636 to provide messages and information to the user.

Figure 39:
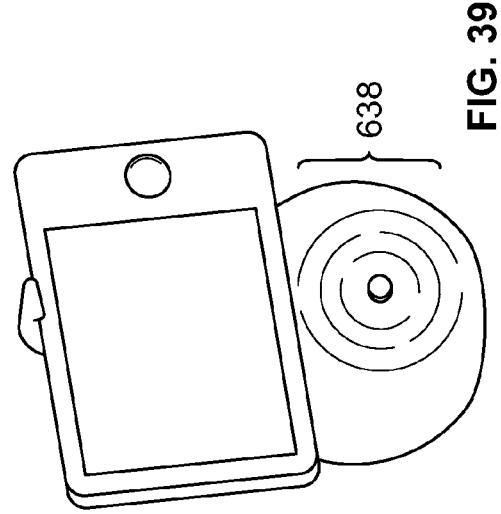

FIG. 39 illustrates a holder comprising internal lights 638 to provide a soft light or glow. The type of lights may vary. For example, standard commercially available lights (such as LEDs) may be used. The lights may be connected to a circuit to provide various patterns, sequences, and status indicator information as is known to those of skill in such arts.

It is to be understood that a wide range of components and features may be incorporated into the universal tablet and smartphone holder. For example, the size and shape may also vary greatly to accommodate different sized devices as well as for toys and other consumer products.

In embodiments, a miniature holder intended for smartphone and similar sized media devices is keychain-sized. The mini-holder preferably has the shapes as described herein except is small enough to be used as a keychain, and can act as a kickstand or backstop to a smartphone.

We claim:

1. A universal media device holder for releasably holding a media device comprising:
   a weighted base;
   a gently curved body extending from the weighted base and defining an internal cavity;
   an upper tip section;
   an elongate spine element, said spine element extending from the base, through the internal cavity, and to the tip section;
   a flexible outer skin surrounding at least a portion of the gently curved body; and
   an exteriorly-disposed media device charger in electrical communication with an internal electrical supply for charging the media device, wherein the exteriorly-disposed media device charger is mounted on the outside of the curved body and the internal electrical supply is inside of the base or the internal cavity.

2. The universal media device holder of claim 1 wherein the base comprises a battery.

3. The universal media device holder of claim 1 wherein the flexible outer skin has a frictional outer surface.

4. The universal media device holder of claim 1 wherein the spine element comprises a moldable wire.

5. The universal media device holder of claim 1 wherein said internal cavity is sized to hold at least one speaker.

6. The universal media device holder of claim 5 wherein the speaker is operable to play audio based on a wireless technology.

7. The universal media device holder of claim 1 wherein the tip section is configured to control an electro or electromechanical function of the holder.

8. The universal media device holder of claim 7 wherein the function is selected from the group consisting of volume adjustment and power.

9. The universal media device holder of claim 1 wherein the base, curved body, and tip section collectively form a droplet-like shape.

10. The universal media device holder of claim 1 wherein the media device charger comprises a thin plate secured to the body of the universal media device holder.

11. The universal media device holder of claim 10 wherein the thin plate is removably secured to the body of the universal media device holder.

12. The universal media device holder of claim 10 wherein the thin plate comprises an adapter to fasten to the media device.

* * * * *